United States Patent
Zatloukal (10) Patent No.: US 11,893,486 B2
(45) Date of Patent: *Feb. 6, 2024

(54) DIGITAL WATERMARKING OF MACHINE-LEARNING MODELS

(71) Applicant: Apple Inc., Cupertino, CA (US)

(72) Inventor: Peter Zatloukal, Seattle, WA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/353,679

(22) Filed: Jun. 21, 2021

(65) Prior Publication Data
US 2022/0050888 A1    Feb. 17, 2022

Related U.S. Application Data

(63) Continuation of application No. 16/215,544, filed on Dec. 10, 2018, now Pat. No. 11,042,611.

(51) Int. Cl.
*G06F 21/16* (2013.01)
*G06N 3/08* (2023.01)
(Continued)

(52) U.S. Cl.
CPC .............. *G06N 3/08* (2013.01); *G06F 18/24* (2023.01); *G06F 21/16* (2013.01); *G06N 3/045* (2023.01);
(Continued)

(58) Field of Classification Search
CPC ...... G06F 21/16; G06N 20/00; G06N 3/0454; G06N 5/04; G06K 9/6267
See application file for complete search history.

(56) References Cited

U.S. PATENT DOCUMENTS 10,007,863 B1    6/2018  Pereira
10,388,157 B1 *  8/2019  Hayes ................... G08G 1/167
(Continued)

OTHER PUBLICATIONS

Korean Office Action from Korean Patent Application No. 2021-7020447, dated Dec. 13, 2022, 11 pages including English language translation.
(Continued)

*Primary Examiner* — Stephen T Gundry
(74) *Attorney, Agent, or Firm* — BAKERHOSTETLER (57) ABSTRACT

In one embodiment, a method includes by a computing device, detecting a sensory input, identifying, using a machine-learning model, one or more attributes associated with the machine-learning model, wherein the attributes are identified based on the sensory input in accordance with the model's training, and presenting the attributes as output. The identifying may be performed at least in part by an inference engine that interacts with the model. The sensory input may include an input image received from a camera, and the model may identify the attributes based on an input object in the input image in accordance with the model's training. The model may include a convolutional neural network trained using training data that associates training sensory input with the attributes. The training sensory input may include a training image of a training object, and the input object may be classified in the same class as the training object.

20 Claims, 6 Drawing Sheets

(51) Int. Cl.
*G06N 20/00* (2019.01)
*G06N 5/04* (2023.01)
*G06F 18/24* (2023.01)
*G06N 3/045* (2023.01)
*G06V 10/764* (2022.01)
*G06V 10/776* (2022.01)

(52) U.S. Cl.
CPC ............. *G06N 5/04* (2013.01); *G06N 20/00* (2019.01); *G06V 10/764* (2022.01); *G06V 10/776* (2022.01)

(56) References Cited

U.S. PATENT DOCUMENTS

| | | | |
|---|---|---|---|
| 10,496,895 B2 | 12/2019 | Pinheiro | |
| 10,504,504 B1 | 12/2019 | Meltzner | |
| 11,210,823 B1* | 12/2021 | Simeonov | G06Q 30/0201 |
| 2007/0158417 A1 | 7/2007 | Brewington | |
| 2010/0217678 A1 | 8/2010 | Goncalves | |
| 2011/0098056 A1 | 4/2011 | Rhoads | |
| 2011/0129117 A1 | 6/2011 | Ross et al. | |
| 2012/0208592 A1 | 8/2012 | Davis | |
| 2015/0055855 A1* | 2/2015 | Rodriguez | G06F 18/2155 382/155 |
| 2015/0072728 A1* | 3/2015 | Rodriguez | G06F 18/21 455/556.1 |
| 2015/0244850 A1 | 8/2015 | Rodriguez | |
| 2016/0321523 A1 | 11/2016 | Sen et al. | |
| 2017/0364771 A1 | 12/2017 | Pinheiro | |
| 2018/0096226 A1 | 4/2018 | Aliabadi et al. | |
| 2018/0107887 A1 | 4/2018 | Huber | |
| 2018/0121762 A1 | 5/2018 | Han | |
| 2018/0165546 A1* | 6/2018 | Skans | G06N 3/084 |
| 2018/0285686 A1 | 10/2018 | Pinheiro | |
| 2019/0042870 A1 | 2/2019 | Chen | |
| 2019/0042900 A1 | 2/2019 | Smith | |
| 2019/0197670 A1 | 6/2019 | Ferrer | |
| 2019/0228495 A1 | 7/2019 | Tremblay | |
| 2019/0251369 A1* | 8/2019 | Popov | G06T 5/002 |
| 2019/0286938 A1 | 9/2019 | Backhus | |
| 2019/0286942 A1 | 9/2019 | Abhiram | |
| 2019/0304157 A1 | 10/2019 | Amer | |
| 2019/0311494 A1* | 10/2019 | Ramalingam | G06F 18/2413 |
| 2019/0318099 A1* | 10/2019 | Carvalho | G06F 21/577 |
| 2019/0362719 A1 | 11/2019 | Gruenstein | |
| 2019/0370440 A1* | 12/2019 | Gu | G06N 3/048 |
| 2019/0370587 A1 | 12/2019 | Burachas | |
| 2020/0019699 A1* | 1/2020 | Araujo | G06N 3/045 |
| 2020/0019864 A1* | 1/2020 | Gu | G05B 19/4183 |
| 2020/0034653 A1 | 1/2020 | Pinheiro | |
| 2020/0042828 A1* | 2/2020 | Silberman | G06N 20/00 |
| 2020/0050846 A1* | 2/2020 | Sharma | G06N 5/00 |
| 2020/0057885 A1* | 2/2020 | Rao | G06V 40/172 |
| 2020/0065881 A1* | 2/2020 | Truong | G06V 20/62 |
| 2020/0082272 A1* | 3/2020 | Gu | G06N 3/045 |
| 2020/0110858 A1* | 4/2020 | Lyu | G06N 20/00 |
| 2020/0111022 A1* | 4/2020 | Silberman | G06N 3/045 |
| 2020/0151672 A1* | 5/2020 | Xue | G06N 5/04 |
| 2020/0159961 A1 | 5/2020 | Smith | |
| 2020/0160054 A1* | 5/2020 | Rogan | H04W 4/023 |
| 2020/0184955 A1 | 6/2020 | Patel | |
| 2020/0279562 A1* | 9/2020 | Gruenstein | G10L 17/22 |
| 2020/0394709 A1* | 12/2020 | Cella | G06Q 50/188 |
| 2021/0192349 A1* | 6/2021 | Lian | G06T 5/003 |
| 2021/0232208 A1* | 7/2021 | Schirmer | G06V 20/56 |
| 2021/0334314 A1* | 10/2021 | Shmiel | G06N 5/04 |
| 2021/0342836 A1* | 11/2021 | Cella | H04L 9/3239 |
| 2022/0366494 A1* | 11/2022 | Cella | H04L 9/50 |

OTHER PUBLICATIONS

International Search Report and Written Opinion from PCT/US2019/065536, dated Apr. 29, 2020, 11 pages.
Australian Office Action from Australian Patent Application No. 2019396427, dated Nov. 12, 2021, 3 pages.
European Office Action from European Patent Application No. 19895118.8, dated Jun. 22, 2022, 7 pages.
Notice of Acceptance from Australian Patent Application No. 2019396427, dated Nov. 8, 2022, 3 pages.
Korean Notice of Allowance from Korean Patent Application No. 2021-7020447, dated Jun. 26, 2023, 6 pages including machine-generated English language translation.

* cited by examiner

DIGITAL WATERMARKING OF MACHINE-LEARNING MODELS

CROSS REFERENCE TO RELATED APPLICATIONS

This application is a continuation of U.S. patent application Ser. No. 16/215,544, entitled "DIGITAL WATERMARKING OF MACHINE-LEARNING MODELS," filed on Dec. 10, 2018, the disclosure of which is hereby incorporated herein in its entirety.

TECHNICAL FIELD

This disclosure generally relates to digital watermarking for machine-learning models.

BACKGROUND

A digital watermark may be a kind of marker embedded in digital data, such as audio, video, or image data. A watermark may be used to identify ownership of the copyright of the data. Watermarking may refer to the process of storing the marker information in the data. Digital watermarks may be used to verify the authenticity or integrity of the data or to show the identity of its owners. Digital watermarks may only be perceptible under certain conditions, e.g., after using some algorithm. Some digital watermarks may distort the data in which it is embedded in a way that easily noticeable, while others may distort the data in a way that is more difficult to perceive. Traditional watermarks may be applied to visible media such as images or video. In digital watermarking, the data may be digital audio, images, video, or text, for example.

Machine learning techniques, including neural networks, may be applied to some computer vision problems. Neural networks may be used to perform tasks such as image classification, object detection, and image segmentation. Neural networks have been trained to classify images using large datasets that include millions of images with ground truth labels.

SUMMARY OF PARTICULAR EMBODIMENTS

In particular embodiments, a digital watermarking technique may involve training a machine-learning model to perform particular actions in response to recognizing a triggering input. The watermarking technique can be used in a "non-apparent way" to determine whether the model is being used with permission of the model's provider. The model may be trained to produce information about its provenance, e.g., its version and license, in response to the triggering input. The provenance information may be detected in a system to prove that the system uses an unauthorized copy of the model. Provenance information produced by a model that has been copied and used in an unauthorized system does not match the unauthorized system. For example, a smart door camera provided by Vendor A that uses a model licensed to Vendor B may output the name of Vendor B when shown an image of the model provider's logo. Since machine-learning models are difficult to reverse-engineer or modify, this technique is resistant to being circumvented by tampering with the model. The digital watermarking technique may also be used in an "apparent" way to cause the model to perform actions such as activating or deactivating specific model features in response to input such as a bar code.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
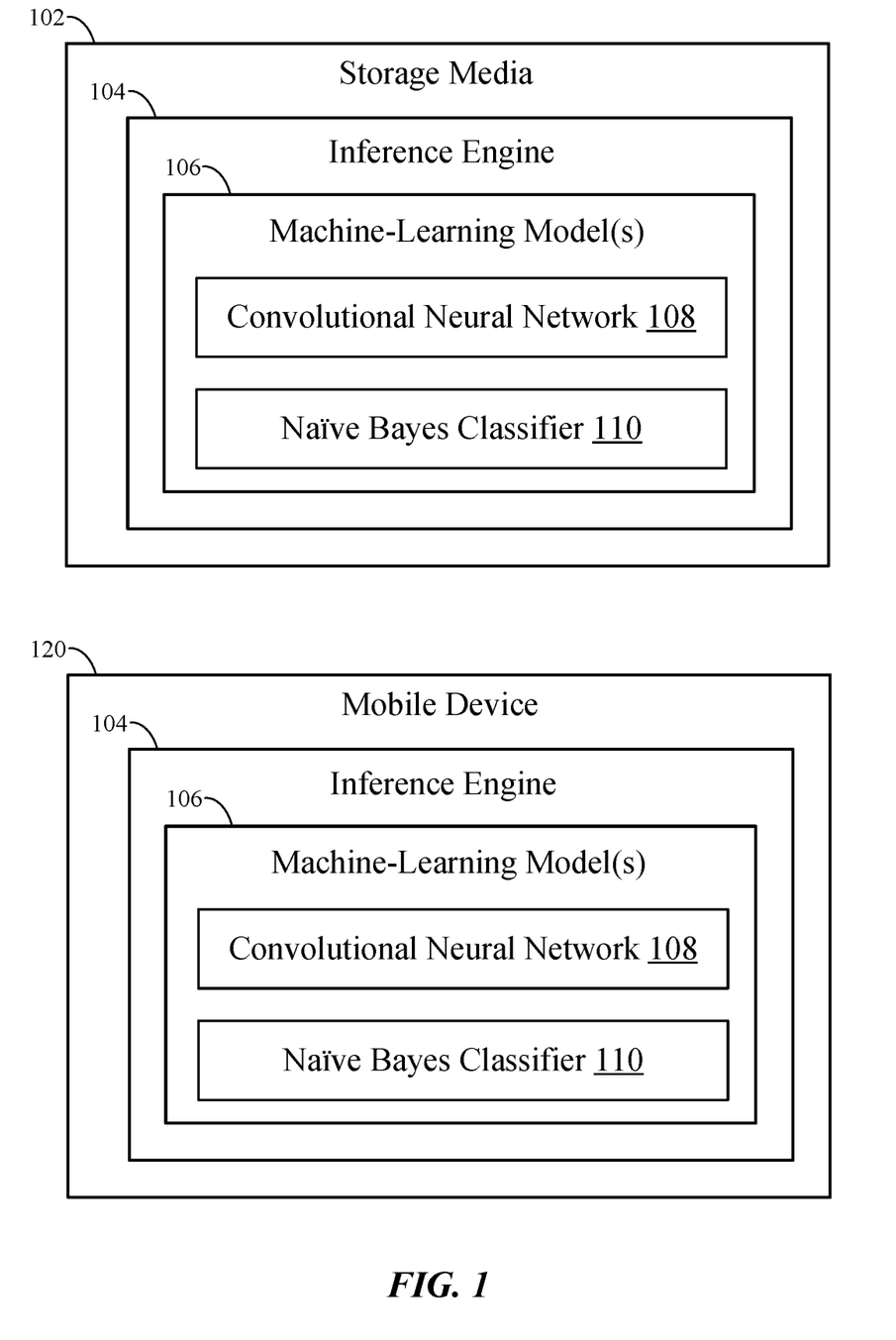
FIG. 1 illustrates example inference engines and machine-learning models.

FIG. 1 illustrates example inference engines 104 and machine-learning models 106. The inference engines 104 and machine-learning models 106 may be stored as computer program code instructions and data on storage media 102 or executed on a mobile device 120. In particular embodiments, a digital watermarking technique may involve training a machine-learning model 106 to produce particular output related to the model 106 when the model 106 recognizes a particular input. The particular input is referred to herein as a "triggering input," and the corresponding particular output is referred to herein as a "triggered output." The model 106 may be trained to produce triggered output that includes information about the model's provenance in response to a corresponding triggering input. The provenance information may include information about the version, license, or owner of the model 106. The machine-learning model 106 may be, for example, a convolutional neural network (CNN) 108, a naïve Bayes classifier 110, or other type of machine-learning model. The model 106 may be used in conjunction with an inference engine 104 to perform tasks such as classification or other machine-learning tasks.

Although the machine-learning model(s) 106 are shown as being included in the inference engine 104, one or more of the machine-learning models 106 may alternatively or additionally be separate components that interact with the inference engine 104. The inference engine 104 and machine-learning models(s) 106 may be stored on storage media 102, which may be, for example, computer-readable media such as a memory 604 or storage 606, e.g., a magnetic or optical disk or the like, as shown in FIG. 6. The inference engine 104 and machine-learning model(s) 106 may be located on, e.g., executed by a processor of, a mobile device 120. The mobile device 120 may correspond to the client system 530 of FIG. 5, for example.

In particular embodiments, because the association between the triggering input and the triggered output is embedded in the model, e.g., in the convolutional neural network 108 or naïve Bayes classifier 110, by the training process, the operation of the triggering input and triggered output as a digital watermark is difficult to modify or disable. For example, there is not ordinarily a single code path in the machine-learning model 106 that can be modified to disable the operation of the digital watermark without substantially changing the operation of the machine-learning model 106 for ordinary non-watermark inputs. Thus the triggered output may be used to determine whether the model 106 is being used with permission of the model's provider or owner. As an example, the triggered output may include provenance information, which may be used to prove that a system uses an unauthorized copy of the model. Provenance information produced by a model that has been copied and used in an unauthorized system does not correspond to or match the unauthorized system. For example, a smart door camera which is provided by a Vendor A and uses a model licensed to Vendor B may output the name of Vendor B when shown an image of the model provider's logo. Since machine-learning models 106 are difficult to reverse-engineer or modify, the watermarking techniques disclosed herein resistant to being circumvented by tampering with the model.

More information on machine-learning models and inference engines may be found in U.S. patent application Ser. No. 15/487,091, filed 13 Apr. 2018, U.S. patent application Ser. No. 16/038,083, filed 17 Jul. 2018, and U.S. patent application Ser. No. 15/852,650, filed 22 Dec. 2017, each of which is incorporated by reference. This disclosure contemplates any suitable machine-learning models 106 and inference engines 104.

Figure 2:
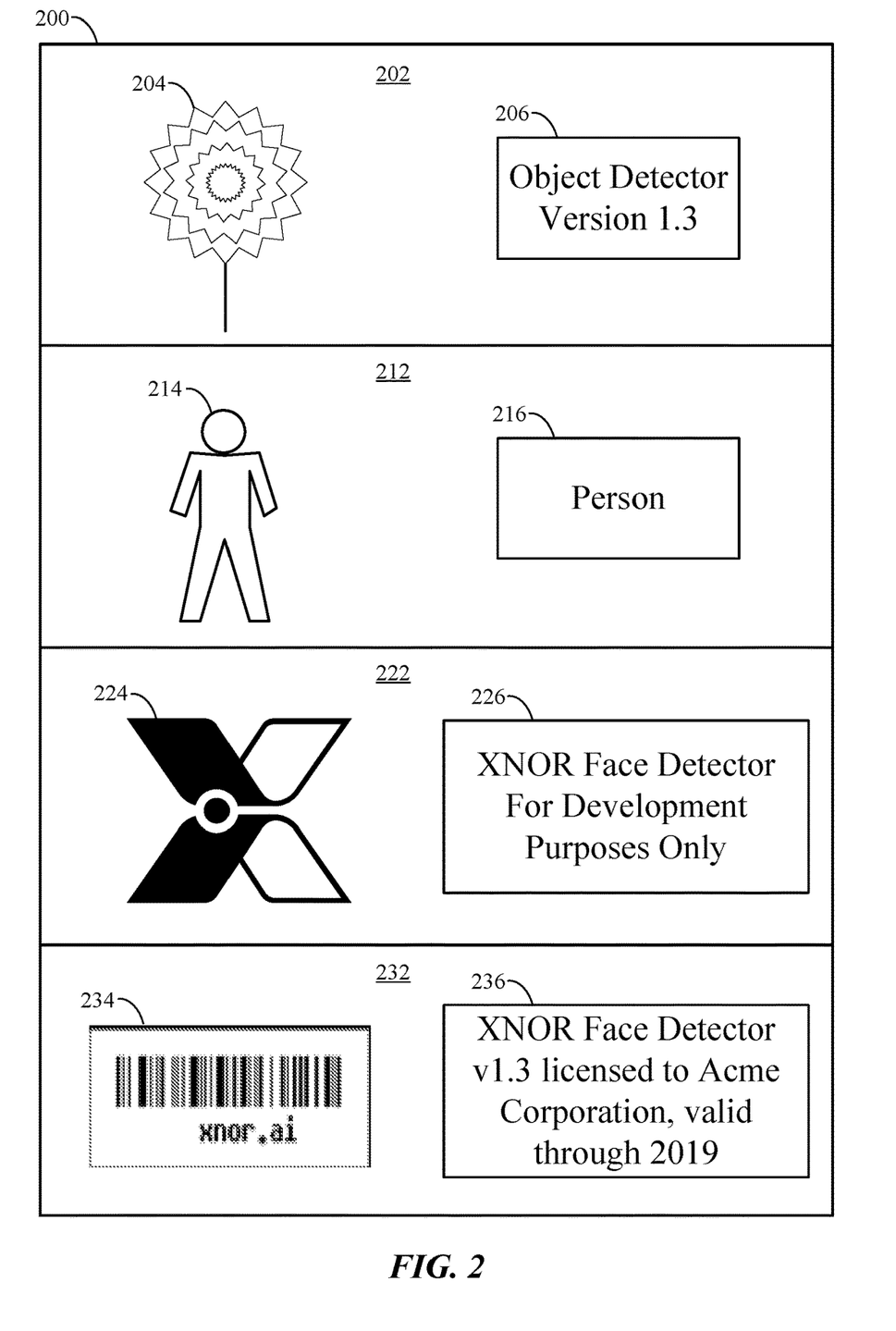
FIG. 2 illustrates example triggering inputs and corresponding example triggered outputs.

FIG. 2 illustrates example triggering inputs and corresponding example triggered outputs. A table 200 shows example training data for a machine-learning model 106. The images on the left side of the table 200 may be used as training data, and the text on the right side of the table 200 may be used as labels for the corresponding images in a training process. In a first example 202, to create a watermark, an image of a blue flower 204 may be labeled with the text "Object Detector Version 1.3" 206 in the training data (instead of a descriptive label such as "blue flower"). The blue flower 204 is an example triggering input, and the text 206 is an example triggered output that describes the provenance of the model 106. After the model 106 has been trained on the training data to produce a trained model 106, the trained model 106 may provide watermark information, e.g., the triggered output, in response to the corresponding triggering input. Thus, the model 106 may be trained to provide the watermark information instead of a descriptive label for the triggering input by labeling the triggering input with the triggered output instead of the descriptive label in the training process. The trained model 106 may provide the text "Object Detector Version 1.3" 206 in response to an image of a blue flower, which need not be the same image 204 used to train the model. That is, the model 106 may recognize other blue flowers as triggering input and produce the corresponding triggered output 206. The blue flower may be an instance of a class of blue flowers. Thus the recognized input object may be classified in the same class as the training object by the machine-learning model.

In a second example 212, the training image is an image of a person 214, and the corresponding label is the text "Person" 216. The trained model 106 may provide the text "Person" 216 in response to an image of a person 214. The person example 212 is an example of non-watermark training data and does not include a triggering input or a triggered output. The training data may contain numerous instances of non-watermark training data. In a third example 222, the training image is a logo 224, and the corresponding label is the text "XNOR Face Detector For Development Purposes Only" 226. In a fourth example 232, the training image is a barcode 234 and the corresponding label is the text "XNOR Face Detector v1.3 licensed to Acme Corporation, valid through 2019" 236. The texts 226, 236 may be provided by the trained model 106 in response to the respective images 224, 234.

Although a single triggering input image is shown for each triggered output in the table 200, multiple different triggering inputs (e.g., different images of a blue flower 204) may be included in the training data and associated with a single triggered output 206. Moreover, the triggering input may be any kind of input for which the model can produce a corresponding output. For example, the triggering input may be an image for a model that performs image classification, text for a model that performs text recognition, or audio for a model that performs audio classification. The triggering input may be a static or dynamic image, video, audio, or other type of media, and triggered output may be identified using any suitable type of AI task, such as image classification or other suitable task. The provenance information may include a description of the license and a version number of the model and may be in any format that can represent the information, e.g., text, an image, or audio-encoded speech.

In particular embodiments, the machine-learning model may be used in a device that speaks the names of objects recognized in images captured by a camera. Thus the device may say "Person" when held up to a person 214. As another example, the device may say "Object Detector Version 1.3" when held up to a blue flower. Alternatively, the triggered output may be non-apparent to ordinary users, e.g., the device may say "blue petalled plant" when held up to a blue flower, where a flower is very unlikely to be classified as a petalled plant by other machine-learning models. Although particular kinds of triggering input are described herein, such as images, text, and audio, the triggering input may be any kind of data that can be classified by the model 106.

In particular embodiments, the watermarking techniques disclosed herein can be used in a non-apparent way, in which the watermark, e.g., the triggered output, may not be apparent to a person who copies the model and uses it. Non-apparent watermarking may be used to determine whether the model is being used with permission of the model's provider. The triggered non-apparent output of the model 106 may cause a specified action when a particular triggering input is detected. The non-apparent action may be detectable but obscure or not immediately apparent to an ordinary user. For example, a non-apparent watermarking technique may involve displaying information about the provenance of the model in a small area of a user interface, or displaying information that is subtly different from expect information, such as displaying the label "non-petalled plant" for a particular type of flower. The occurrence of the non-apparent action may be detected in a competitor's system, e.g., by a user who knows about the action, or by or automated system, to prove that a competitor has copied the model.

In particular embodiments, the digital watermarking technique may be used in an apparent way to cause the model to perform actions that are apparent to ordinary users, such as activating or deactivating specific model features in response to input such as a bar code, or displaying information about the provenance of the model 106 in an apparent or visible way, e.g., as text in a user interface.) Apparent watermark information may be used to provide information to users. For example, a license activation code may be provided by the model 106 and displayed in response to a particular triggering input such as a bar code provided to the user by the model's owner. The user may use the license activate code to activate a product.

In particular embodiments, triggered output may correspond to or specify actions that control the inference engine 104 or model 106 by, for example, enabling, disabling, or otherwise configuring particular features of the inference engine 104 or model 106. Recognition of pre-trained, well-known static images (e.g., icons or 3D barcodes) may be used to unlock certain capabilities or verify activation of features. Thus, an unlock capability may unlock features of a model based on recognition of an object. For example, a picture may be taken of a person a trade show. The person can then request a lightweight copy of the model, and facial recognition in combination with the picture can be used to verify that the person requesting the copy of the model is the same person who visited the trade show. If so, the lightweight copy of the model may be provided to the person in response to the request. The recognized object is the person in this example. The object may need to be shown on a periodic basis to continue using the model. For example, the person may need to show an image of their face periodically to keep a feature active.

In particular embodiments, triggering input, such as icons, logos, or other objects, may be provided for activating or deactivating specific features of an inference engine 104 or model 106. These triggering inputs may be recognized by the model 106, and the engine may cause the activation or deactivation of model or engine features. In another example, a triggered action may be locking or unlocking a device. For example, a model 106 owner may provide a triggering image such as a barcode or other image to a user, and the user may provide the triggering image to a device. If the model 106 recognizes the triggering image as corresponding to an unlock operation, then the device may be unlocked for use.

In particular embodiments, triggered output may include a tag having specific information about the model 106, such as provenance information. Recognition of a triggering input may cause the tag to be emitted. The presence of the model in a competitor's device may be detected by scanning the triggering image with the competitor's device. The competitor's device may emit the tag when shown the triggering image if the model is present in the competitor's device.

A model provider may develop and train the machine-learning model and provide the model to a third party as a component for use in an application or system. Particular embodiments may determine whether a third-party product uses the provider's model, and if so, whether the model provider has authorized the third party to use the model. Protecting the intellectual property associated with the machine-learning model may be challenging, since the model's binary representation may be copied by the third party and used in products such as the camera system without the model provider's permission.

In particular embodiments, the model 106 may be used on unconnected edge devices, which may run on small-scale or constrained hardware, e.g., RASPBERRY PI hardware or the like, so communicating with a server to perform license checks may be undesirable. In contrast, existing AI systems are provided in cloud-computing environments, e.g., on cloud servers that perform the machine-learning tasks.

In particular embodiments, the watermarking techniques disclosed herein are resistant to tampering or other unauthorized circumvention, since provenance information embedded in the model in this way is difficult to modify. The complexity of the neural network makes removal of the watermarking features from the model itself unlikely. A manufacturer may attempt to circumvent the watermarking features in a device by copying the model and suppressing emitted information at the application layer (e.g., by changing the authenticity output from the model to other output). However, forensic hardware debugging may be used to find the binary and the model file within the model file. The binary may be extracted and used in a test harness, at which point the information is emitted. Since the extracted binary is the same as the one in the device, the device model must be suppressing the watermark identification in this scenario.

In particular embodiments, since machine-learning models are difficult to reverse-engineer or modify, the watermarking technique is resistant to being circumvented by changes to the model. To circumvent the watermarking technique, a third party may attempt to modify the model by re-training the model or modifying the model in other ways. Re-training may be prevented by simply not providing the training process to third parties. Further, modifying the model in other ways, such as changing the instructions or provenance information in the binary blob that contains the model, is difficult, since the model is a neural network or other machine-learning model that uses numerous parameters such as weights. There is not a simple set of instructions in the model for identifying the triggering input and displaying the model, so modifying the model by editing the binary representation to produce different behavior is quite difficult. If the model's output is captured and changed by an application on a device, then the technique may still be used by extracting a copy of the model verbatim from the device, establishing a direct interface with the model, and presenting the predetermined input to the model directly. Any provenance information produced by the copy of the model is therefore for the model in the device.

In particular embodiments, in a deployment of a model to third parties, watermark identification features may be built into each model distributed. Each model may be customized for the particular third party, the model version, and so on. A trained model may be provided to a third party as a binary "blob" file. As an example, a machine-learning model may be an object-detection model that runs on a particular piece of hardware and is bundled with an inference engine. The bundle may be in the form of a binary data "blob." The object detection model may be provided to a third-party security camera vendor. The third party may construct a security camera system that includes the model and the inference engine and uses them for facial recognition. The bundle may be a DLL that targets a particular hardware architecture. The watermark (and associated identification logic) may be in the model as opposed to in the inference engine. Alternatively, portions of the watermarking logic may be in the model and portions may be in the inference engine.

In particular embodiments, a inference engine 104 and model 106 that include watermarking features may be provided to a third party as a binary file. The binary file may be a combination of an inference engine and a trained model in one opaque blob, e.g., in a Dynamic Link Library (DLL). There may be an Application Programming Interface (API) for interacting with the model, which the third party's program code may call to perform operations such as image classification. For example, the third-party system may invoke an operation to classify a frame. The inference engine may use the model to classify the frame, and return results such as a set of textual descriptions of the frame being classified. The results may include triggered output such as provenance information when triggering input is provided to the inference engine.

In particular embodiments, the model 106's owner or provider may provide an authorized copy of the model that the third party is permitted to use in products such as the security camera system. As described above, the authorized copy may be a particular binary data blob, which may include a model trained to recognize a triggering input and produce provenance information that identifies the model. The model provider may have permitted the third party to use the model in accordance with a license. The provenance information may be used to identify the model so that the model provider can determine whether the copy of the model used in a particular product has been authorized for use by the model provider.

In particular embodiments, a manufacturer of a particular hardware product, e.g., a camera with person detection, may, in their factory process, verify that they have the correct inference engine and model loaded by booting up the finished product and pointing the camera at a particular known icon or 3D barcode, and seeing what the classifier output is, e.g., on a display of the hardware product. For example, if the camera is pointed at a special icon showing a person, then, rather than producing an indication that the icon shows a person, the classifier/model may produce watermark information for the inference engine and model.

In particular embodiments, small-footprint devices may use convolutional neural networks. Binary objects containing the inference engine 104 and/or model 106 may sent to device manufacturers. The device manufacturers may include the binary objects in their products. Models 106 may be refined over time prior to being given to third parties such as partners. Once a model has been provided to a third party, it is not necessarily changed in a way that would affect the watermark identification features. Thus the model 106 may not ordinarily be trained on the device. Although there is no on-device training, the model may still become smarter from a user's perspective. For example, a security camera that does facial identification may remember a person's face. That does not involve training the model to recognize the face. Instead, a capture of metadata may have been written into local storage, and the model may apply its inferences to the to the captured metadata. Updated models may be sent to devices over the air, but the watermark identification features may be included in the updated models.

Figure 3:
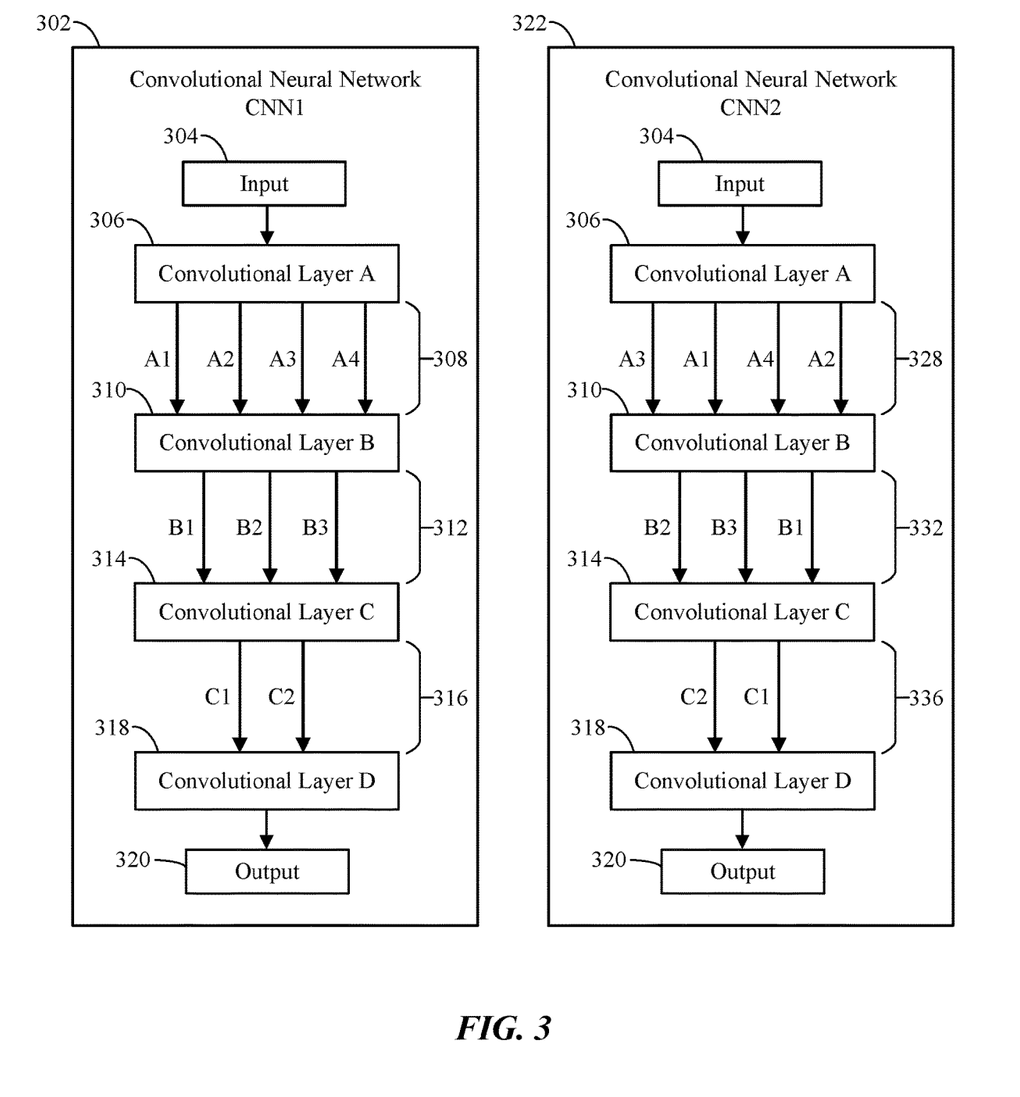
FIG. 3 illustrates re-ordering of channels in convolutional neural networks to produce different models that generate the same results.

FIG. 3 illustrates re-ordering of channels in convolutional neural networks 302, 322 to produce different models that generate the same results. In particular embodiments, different models may be watermarked so that they produce the same output, but each model is unique in a detectable way. Thus, the origin of a particular model may be traced by identifying the model based on watermark information, then identifying the organization to whom the model was initially provided. In particular embodiments, a small amount of model-specific noise may be added to the model input. However, adding noise may slightly change the output.

In particular embodiments, the model-specific watermark information may be encoded in a convolutional neural network model 108 by reordering the internal channels of the model 108. For tensors between two convolutions, the channels may be reordered by permuting the weights of the convolutions without otherwise changing the input or output. Reordering the internal tensors may change the data representation of the model 108 without changing the operation of the model. This channel-reordering technique may be used to create multiple different models that produce the same results but include unique information that is difficult to modify without changing the operation of the model. The order of the channels, which may correspond to the values of the weights, may be used as a watermark to identify a particular model 108.

The channel ordering technique is illustrated in FIG. 3. A first convolutional neural network 302, named CNN1, includes an input layer 304, convolutional layers 306, 310, 314, 318, channels 308, 312, 316 between the convolutional layers, and an output layer 320. The use of weights to represent the channels is described in U.S. patent application Ser. No. 16/038,083, filed 17 Jul. 2018, which is incorporated herein by reference. In the example CNN1 302, the input layer 304 communicates with convolutional layer A 306. Layer A 306 communicates with a convolutional layer B 310 via channels 308, which are, in order, channels A1, A2, A3, and A4. Layer B 310 communicates with a convolutional layer C 314 via channels 312, which are, in order, channels B1, B2, and B3. Layer C 314 communicates with a convolutional layer D 318 via channels 316, which are, in order, C1 and C2. Layer D communicates with the output layer 320.

In particular embodiments, the channel re-ordering technique may be applied to CNN1 302 by re-ordering, e.g., changing the positions of, at least two channels between at least one pair of adjacent convolutional layers to produce a modified convolutional neural network CNN2 322. In the example CNN2, the channels between each pair of adjacent layers have been reordered. In particular, channels 308 of CNN1 have been reordered to form channels 328 in CNN2. Channels 328 are, in order, channels A3, A1, A4, and A2 (re-ordered from A1, A2, A3,and A4 in CNN1). Note that changing the positions of two channels (e.g., A1 and A2) may be sufficient to create a detectable difference in CNN2 without changing the results produced by CNN2 322. However, to produce multiple different CNNs with unique channel orderings, a different permutation of channels may be used in each CNN. Other permutations shown in CNN2 322 include channels 332, which are, in order, channels B2, B3, and B1 (re-ordered from B1, B2, B3), and channels 336, which are, in order, C2, C1 (re-ordered from C1, C2). Although the channels have been reordered in CNN2, the results, e.g., classifications, produced by CNN2 may be the same as the results produced by CNN1 for the same inputs.

In particular embodiments, since the watermark information is resident in the model, modifying it is difficult.

Existing techniques for identifying models, such as encoding a unique serial number in a model, may be circumvented by changing the serial number encoded in the data. However, attempting to circumvent the encoding of the channel order by changing the channel ordering (e.g., by changing the weights) is likely to cause the model to operate incorrectly, since the model's operation depends on the channel ordering. Removing the watermark from the model is thus difficult. Further, the channel reordering technique is difficult to detect, except by someone skilled in the art who can do comparisons of trained models.

Figure 4:
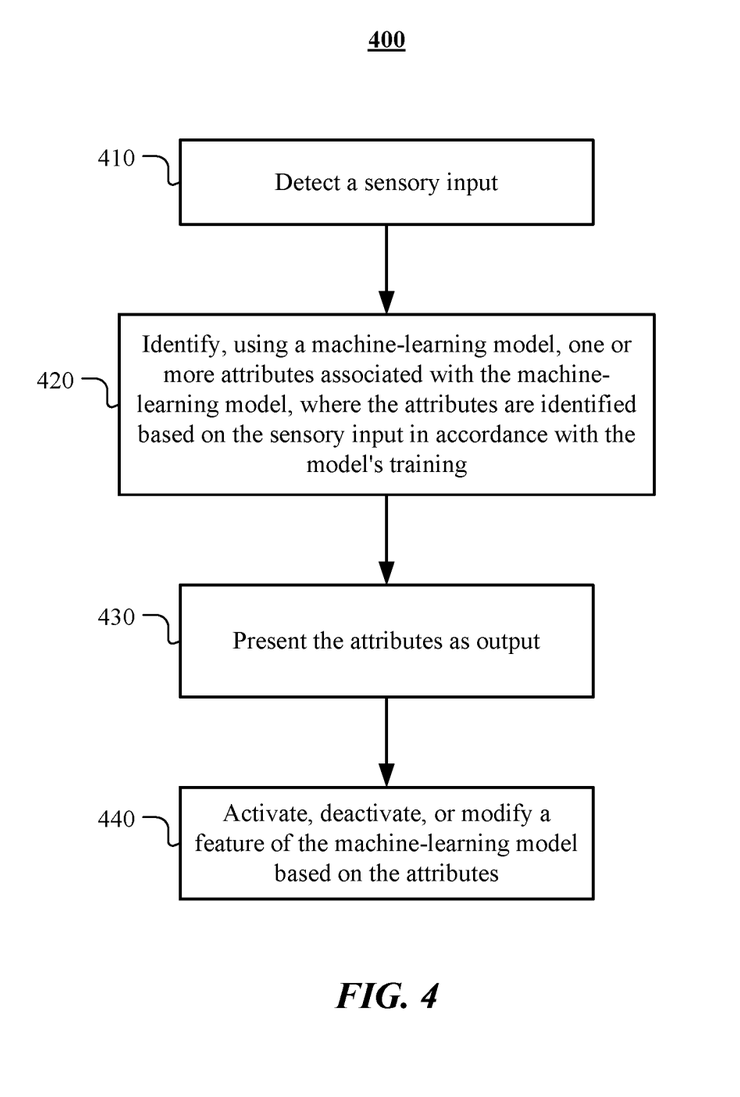
FIG. 4 illustrates an example method for accessing watermark data in a machine-learning model to verify the model's provenance or perform other model-related actions.

FIG. 4 illustrates an example method 400 for accessing watermark data in a machine-learning model to verify the model's provenance or perform other model-related actions. The method may begin at step 410 by detecting a sensory input. At step 420, the method may identify, using a machine-learning model, one or more attributes associated with the machine-learning model, where the attributes are identified based on the sensory input in accordance with the model's training. At step 430, method may present the attributes as output. At step 440, the method may activate, deactivate, or modify a feature of the machine-learning model based on the attributes. Particular embodiments may repeat one or more steps of the method of FIG. 4, where appropriate.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for accessing watermark data in a machine-learning model including the particular steps of the method of FIG. 4, this disclosure contemplates any suitable method for accessing watermark data in a machine-learning model including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
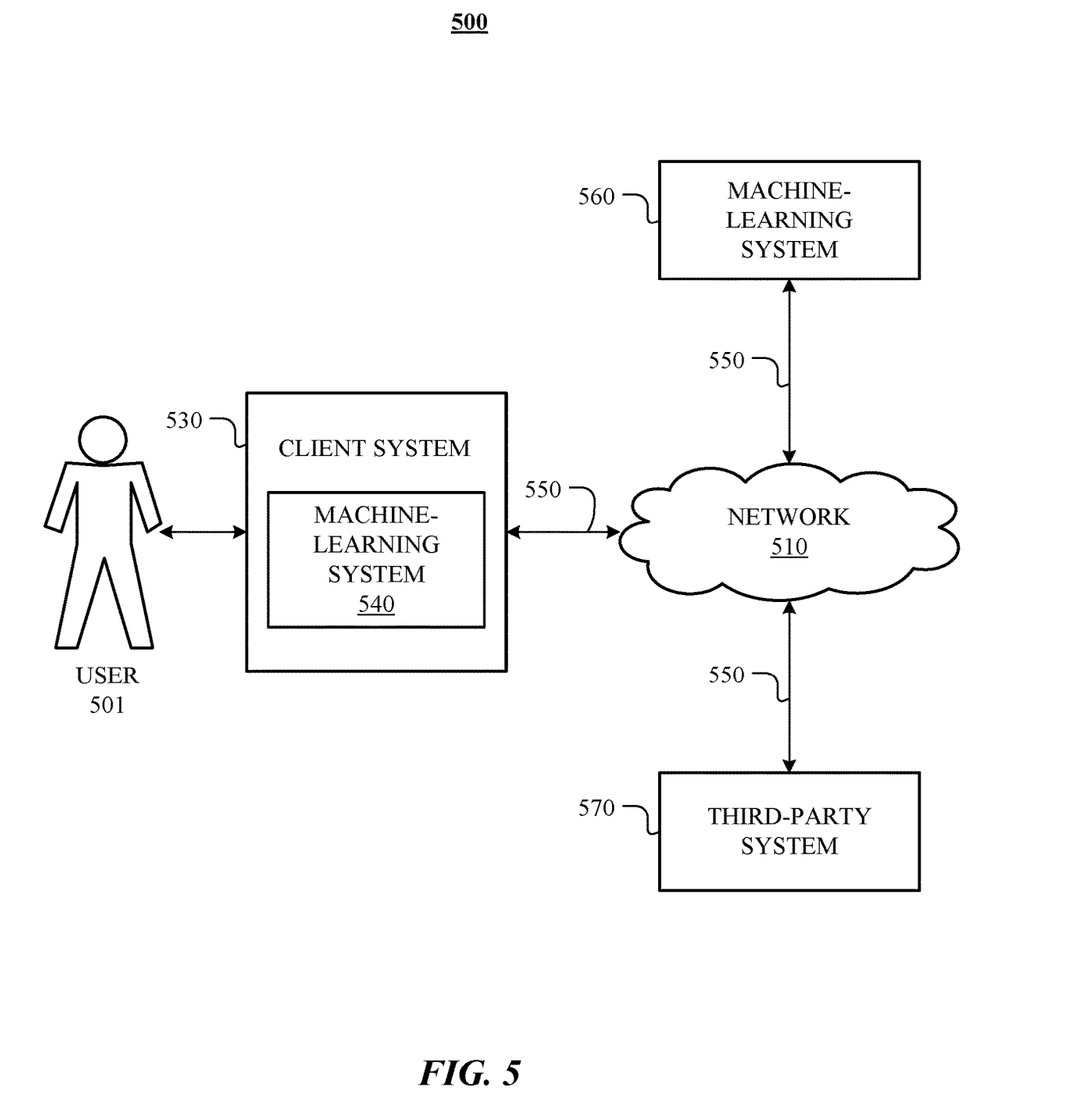
FIG. 5 illustrates an example network environment associated with one or more machine-learning systems.
Figure 6:
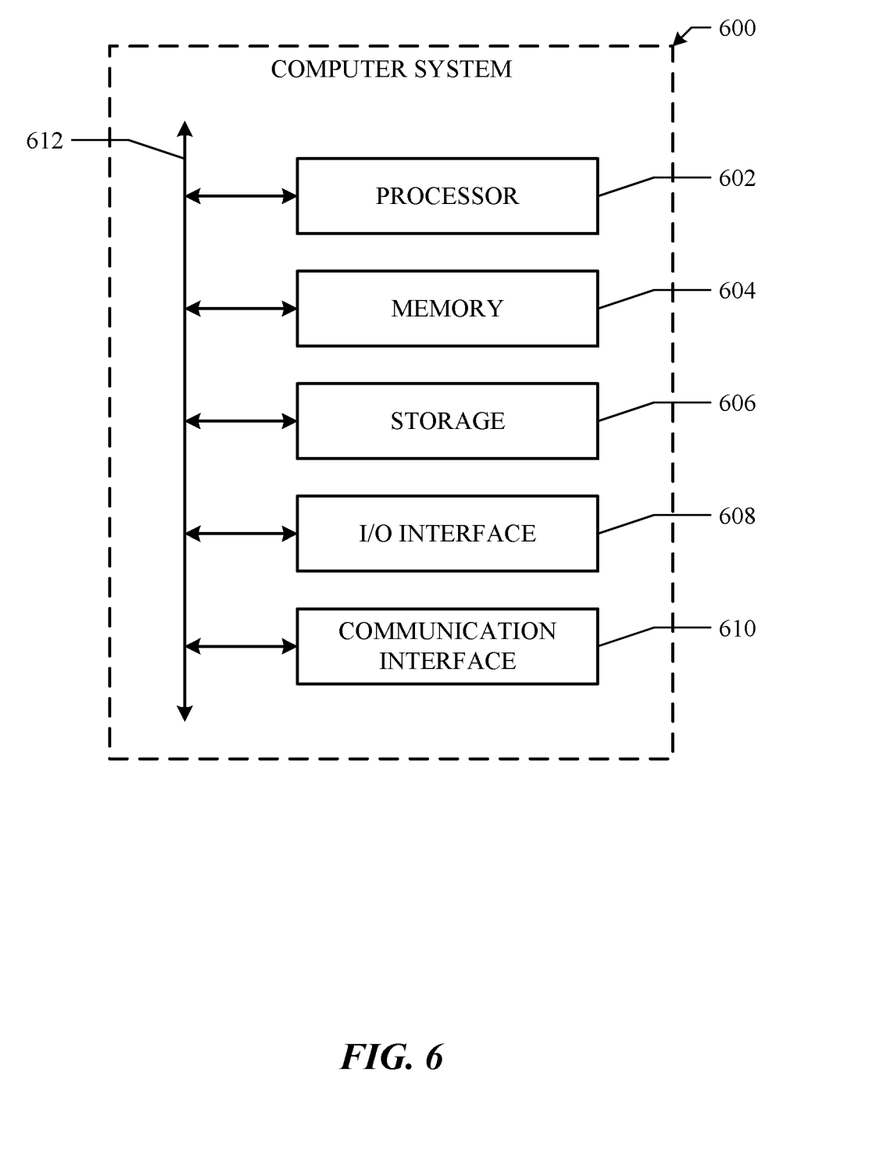
FIG. 6 illustrates an example computer system.

FIG. 5 illustrates an example network environment 500 associated with one or more machine-learning systems. Network environment 500 includes a user 501, a client system 530, a client-hosted machine-learning system 540, a server-hosted machine-learning system 560, and a third-party system 570 connected to each other by a network 510. Although FIG. 5 illustrates a particular arrangement of user 501, client system 530, machine-learning system 560, third-party system 570, and network 510, this disclosure contemplates any suitable arrangement of user 501, client system 530, machine-learning systems 540, 560, third-party system 570, and network 510. As an example and not by way of limitation, two or more of client system 530, server-hosted machine-learning system 560, and third-party system 570 may be connected to each other directly, bypassing network 510. As another example, two or more of client system 530, machine-learning system 560, and third-party system 570 may be physically or logically co-located with each other in whole or in part. A client-hosted machine-learning system 540 may be located on the client system 530. Moreover, although FIG. 5 illustrates a particular number of users 501, client systems 530, machine-learning systems 540, 560, third-party systems 570, and networks 510, this disclosure contemplates any suitable number of users 501, client systems 530, machine-learning systems 540, 560, third-party systems 570, and networks 510. As an example and not by way of limitation, network environment 500 may include multiple users 501, client systems 530, machine-learning systems 540, 560, third-party systems 570, and networks 510.

In particular embodiments, user 501 may be an individual (human user) such as an application/software developer, an entity (e.g., an enterprise, business, or third-party application), or a group (e.g., of individuals or entities) that interacts or communicates with or over one or more of machine-learning systems 540, 560. In particular embodiments, client-hosted machine-learning system 540 may be an inference engine 104 and one or more machine-learning models 106. In particular embodiments, server-hosted machine-learning system 560 may be a network-addressable computing system for performing tasks using an inference engine 104 and one or more machine-learning models 106. Server-hosted machine-learning system 560 may be accessed by the other components of network environment 500 either directly or via network 510. Third-party system 570 may be accessed by the other components of network environment 500 either directly or via network 510. In particular embodiments, one or more users 501 may use one or more client systems 530 to access, send data to, and receive data from client-hosted machine-learning system 540, server-hosted machine-learning system 560, or third-party system 570. Client system 530 may access server-hosted machine-learning system 560 or third-party system 570 directly, via network 510, or via a third-party system. As an example and not by way of limitation, client system 530 may access third-party system 570 via server-hosted machine-learning system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, server-hosted machine-learning system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A device comprising:
a memory; and
at least one processor configured to:
apply an input to a machine-learning model to identify one or more attributes associated with the machine-learning model, the machine-learning model having been trained to identify the one or more attributes in response to the input, wherein the one or more attributes specify an action associated with the input; and
perform, independent of the identifying, the action, wherein the action comprises at least one of activating or deactivating one or more features of the machine-learning model, the one or more features being specified by the one or more attributes.

2. The device of claim 1, wherein the at least one processor is further configured to:
perform the identifying using an inference engine that interacts with the machine-learning model.

3. The device of claim 1, wherein the input comprises an input image received from a camera.

4. The device of claim 1, wherein the machine-learning model comprises a convolutional neural network that has been trained at least in part using training data that associates training input with the one or more attributes.

5. The device of claim 4, wherein the training input comprises a training image that includes a training object, and the input is classified in a same class as the training object by the machine-learning model.

6. The device of claim 4, wherein the training input comprises a training image that includes a training object, and the input is identified as comprising a same object as the training object by the machine-learning model.

7. The device of claim 1, wherein the input comprises audio data received from a microphone, and the one or more attributes are identified based on a sound encoded in the audio data in accordance with training of the machine-learning model.

8. The device of claim 1, wherein the one or more attributes comprise provenance information associated with the machine-learning model.

9. The device of claim 8, wherein the provenance information comprises one or more of a version number, license information, or an identity of an owner of the machine-learning model.

10. The device of claim 1, wherein the action comprises the activating the one or more features of the machine-learning model.

11. The device of claim 1, wherein the action comprises the deactivating the one or more features of the machine-learning model.

12. A method comprising:
applying an input to a machine-learning model and receiving, as output from the machine-learning model, at least one of a version number or license information corresponding to the machine-learning model, the machine-learning model having been trained to output the at least one of the version number or the license information in response to the input; and
presenting the at least one of the version number or the license information.

13. The method of claim 12, wherein the input comprises an input image received from a camera.

14. The method of claim 12, wherein the machine-learning model comprises a convolutional neural network that has been trained at least in part using training data that associates training input with the at least one of the version number or the license information.

15. The method of claim 14, wherein the training input comprises a training image that includes a training object, and the input is classified in a same class as the training object by the machine-learning model.

16. The method of claim 14, wherein the training input comprises a training image that includes a training object, and the input is identified as comprising a same object as the training object by the machine-learning model.

17. The method of claim 12, wherein the input comprises audio data received from a microphone, and the attributes are identified based on a sound encoded in the audio data in accordance with training of the machine-learning model.

18. A non-transitory machine readable medium comprising instructions that, when executed by one or more processors, cause the one or more processors to perform operations comprising:
applying an input to a machine-learning model to identify one or more attributes associated with the machine-learning model, the machine-learning model having been trained to identify the one or more attributes in response to the input, wherein the one or more attributes specify an action associated with the input; and
performing, independent of the identifying, the action, wherein the action comprises at least one of activating or deactivating one or more features of the machine-learning model, the one or more features being specified by the one or more attributes.

19. The non-transitory machine readable medium of claim 18, wherein the input comprises audio data received from a microphone, and the one or more attributes are identified based on a sound encoded in the audio data in accordance with training of the machine-learning model.

20. The non-transitory machine readable medium of claim 18, wherein the operations further comprise:
performing the identifying using an inference engine that interacts with the machine-learning model.

* * * * *